(12) United States Patent  
Bastians

(10) Patent No.: US 7,531,969 B2  
(45) Date of Patent: May 12, 2009

(54) ARC LAMP IMPROVEMENTS

(75) Inventor: David Bastians, Gilles Plains (AU)

(73) Assignee: Niteflux Pty Ltd, Gilles Plains (AU)

( * ) Notice: Subject to any disclaimer, the term of this patent is extended or adjusted under 35 U.S.C. 154(b) by 122 days.

(21) Appl. No.: 10/573,126

(22) PCT Filed: Sep. 24, 2004

(86) PCT No.: PCT/AU2004/001298

§ 371 (c)(1),  
(2), (4) Date: Nov. 17, 2006

(87) PCT Pub. No.: WO2005/032219

PCT Pub. Date: Apr. 7, 2005

(65) Prior Publication Data

US 2007/0200510 A1    Aug. 30, 2007

(30) Foreign Application Priority Data

Sep. 26, 2003 (AU) .............................. 2003905253

(51) Int. Cl.  
*H05B 37/02* (2006.01)

(52) U.S. Cl. .................. 315/291; 315/224; 315/247

(58) Field of Classification Search ............ 315/209 R, 315/224–225, 246–247, 276, 283, 291  
See application file for complete search history.

(56) References Cited

U.S. PATENT DOCUMENTS

| 6,163,115 A | * | 12/2000 | Ishizuka | 315/308 |
| 6,356,039 B2 | | 3/2002 | Huot et al. | |
| 6,815,910 B2 | * | 11/2004 | Suzuki et al. | 315/291 |
| 6,953,260 B1 | * | 10/2005 | Allen | 362/194 |
| 7,084,584 B2 | * | 8/2006 | Ben-Yaakov | 315/291 |
| 2003/0034744 A1 | * | 2/2003 | Toyama | 315/291 |
| 2003/0057870 A1 | * | 3/2003 | Toyama | 315/224 |
| 2004/0000880 A1 | * | 1/2004 | Ozasa et al. | 315/291 |
| 2004/0095069 A1 | * | 5/2004 | Yamashita et al. | 313/594 |

FOREIGN PATENT DOCUMENTS

| EP | 0 822 563 | 3/2001 |
| EP | 1 121 003 | 8/2001 |
| EP | 1 272 012 | 1/2003 |

OTHER PUBLICATIONS

International Search Report for PCT/AU2004/001298 dated Dec. 3, 2004 (2 pages).  
Patent Abstracts of Japan 09-017586 dated Jan. 17, 1997 (1 page).

* cited by examiner

*Primary Examiner*—David H Vu  
*Assistant Examiner*—Tung X Le  
(74) *Attorney, Agent, or Firm*—Osha • Liang LLP

(57) ABSTRACT

An arc lamp power supply with a first part including a converter adapted to convert a low voltage power supply to provide an arc running power supply suitable for running an arc lamp after an arc has been struck; a second part adapted to receive an output of said arc running power supply and to apply said supply to an arc lamp, including means to effect a high voltage power supply suitable for starting an arc in an arc lamp; and a flexible electrical cable adapted to connect the first part to the second part, carrying the arc running power supply voltage. The first part is adapted to be remotely mounted or held in a place or manner where the bulk of the second part would be inconvenient.

14 Claims, 3 Drawing Sheets

ARC LAMP IMPROVEMENTS

TECHNICAL FIELD

This invention relates to power supplies for portable arc lamps.

BACKGROUND ART

It is known to use low power metal halide arc lamps in portable lighting systems. These low powered arc light systems are popular in bicycling and other outdoor pursuits where it is necessary to have a portable, high-powered light source. It is also often required to have the light source head or helmet mounted, or for it to be conveniently hand carried or worn on the body of a user. These requirements pose some problems with respect to the positioning of key components in the arc lighting apparatus.

Arc lamp technology cannot be simply powered from a low voltage battery. Arc lamps typically require a voltage pulse of around 6 kV to strike the arc and then typically 50-100V to continue running. An electronic ballast is required to generate the starting voltage and deliver the running voltage. Because of the high voltages involved, protection circuitry is also required to minimize the risk of arcing into the ambient environment in times when system integrity is compromised.

The control and ignition circuitry for low power arc lighting ballasts has always been physically combined on the same printed circuit board. In outdoor pursuit lighting applications, including bicycle lighting applications, this limits the number of ways that arc lighting systems can be positioned.

It is known to use a simple ballast that sits in a carry bag attached to the frame of a bicycle. Battery power is delivered into the ballast on one side via a cable. The output of the ballast unit is delivered to the lamp via high-tension cable.

This has the disadvantage that a double insulated cable able to withstand a 6 kV ignition spike without breakdown must be provided. Cable capable of withstanding such voltage stress is normally thick and bulky, which is not ideal for helmet-mounted systems, or systems where the light unit is hand-carried, where flexibility and ease of movement are desirable. Further, many users would be uncomfortable with the thought of such a high voltage pulsing around their body, in particular the head and neck region. There is a further disadvantage that in the event of cable damage (off road cycling is a sport that is particularly rough on equipment), arcing during the ignition phase of the lamp running cycle may prove hazardous. In diving applications, such a possibility is clearly even less desirable.

A further disadvantage is that the properties of the cable and the ambient environment may interfere with the ignition pulse and may affect starting reliability for the lamp. There is a modest upper limit to how long the cord can be else the lamp may fail to ignite.

An alternative known arrangement involves the entire ballast electronics being attached directly to the lamp with only low voltage cable running to the battery.

This addresses the issue of bulky and unsafe cables. However this arrangement does mean that the ballast electronics add significant size and weight to any helmet mounted system. This extra bulk can cause problems with helmet positioning and can put unwanted stress on neck muscles and joints. This issue is especially significant for riders who wish to use the equipment for extended periods such as 24 hour or ultra-endurance events.

In underwater applications, large lamp enclosures make for poor hydrodynamics, with bulky hand-held enclosures being difficult to manage especially in currents.

Also, the low voltage DC cable running to the ballast can be of sufficient length to introduce significant losses.

A further problem is that the componentry in ballast circuits is usually temperature sensitive. The presence of a lamp running nearby, generating significant amounts of heat, can make thermal management difficult.

DISCLOSURE OF THE INVENTION

It is proposed that these two system functional parts are physically separated so that a part that will generate high voltage can be left to be close to the arc lamp itself while the part that will supply a running power at much lower voltage which will also generally be a heavier part will be able to be connected by a cable so that it can be located distal from a head of a user.

In one form of the invention there is provided an arc lamp power supply including a first part including a converter adapted to convert a low voltage power supply to provide an arc running power supply suitable for running an arc lamp after an arc has been struck;

a second part adapted to receive an output of said arc running power supply and to apply said supply to an arc lamp, including means to effect a high voltage power supply suitable for starting an arc in an arc lamp;

and a flexible electrical cable adapted to connect the first part to the second part, carrying the arc running voltage.

In preference the converter is a DC—DC converter.

In preference, the converter is a boost converter.

In preference, in the alternative, the converter is a DC—DC flyback converter, including a ballast and a switch, the duty cycle of the switch being controlled by an oscillator.

In preference the duty cycle of the switch is controlled by an electronic controller, or in the alternative, by a switch.

In preference, the first part is housed in a housing adapted to be mounted on the frame or body of a bicycle or a motor vehicle.

In preference, the first part is housed in a housing adapted to be worn about the body of or attached to the clothing of a wearer.

In preference the means to effect a high voltage power supply includes a means to accumulate a voltage from said arc running power supply, a coil and means to apply this accumulated voltage in a pulse to the coil.

In preference, the means to apply voltage in a pulse is a gas discharge tube or in the alternative, a switch.

The invention may be said to reside in an arc lamp power supply including a first part including a converter adapted to convert a low voltage power supply to provide an arc running power supply suitable for running an arc lamp after an arc has been struck; and a the second part, connected to the first part by a flexible electrical cable, which includes a capacitor, a gas discharge tube and a centre tapped transformer, wherein in use, the capacitor is charged by the arc running power supply until the breakdown voltage of the gas discharge tube is reached, whereupon the tube conducts, applying a voltage pulse to the centre tap on the transformer, thereby applying an arc striking voltage to a connected arc lamp.

This cable then will then not need to carry high voltage even during ignition. The running voltage of 50V-100V makes for very low DC losses.

In preference the heavier components are located on a belt around the waist of a user or on the frame of a bike or otherwise.

In preference a main power control module is located close to the battery. The trigger circuit and arc lamp are located in a separate lightweight housing adapted to be helmet mounted. This can where appropriate be also mounted elsewhere for instance it can be handlebar mounted but the option is open for a user. As a trigger circuit which is needed to supply a high voltage requires only a few small components, this allows the trigger/lamp assembly to be small and lightweight. Also, the small size of the lamp enclosure, makes for simple hydrodynamics in underwater use.

There is now therefore no high voltage cables to run over the head and neck of a user in helmet mounted applications, or about the body of a user in hand-held applications. The kilovolt trigger pulse is generated close to the arc lamp pins, safely inside the lamp housing. All that is required to travel through the cable that joins the power stage and the lighting head is a cable with 50-100V running voltage. Prior to ignition, there may be a brief period where cable voltage can reach 230V but this is obviously much less than the several kV associated with the prior art. Cable rated at 300V DC is light and flexible compared to the double insulated cables required for kilovolt stresses. Also, if this 300V cable is ever damaged, the risk of arcing into the ambient atmosphere is low. Further, the power dissipated in the cable at such voltages is low.

The improved reliability in lamp ignition, less need for heat dissipation, and the reduced losses in long cable runs make this split system of ballast power and ignition especially versatile. It is well suited to a variety of applications where arc lamps are in use. The system may be adapted for use with diving lights, and for use with navigation lights on a range of vehicles where longer cable runs are desirable.

BRIEF DESCRIPTION OF THE DRAWINGS

For a better understanding of this invention it will now be described with respect to the preferred embodiment which shall be described herein with the assistance of drawings wherein.

BEST MODE FOR CARRYING OUT THE INVENTION

Figure 1:
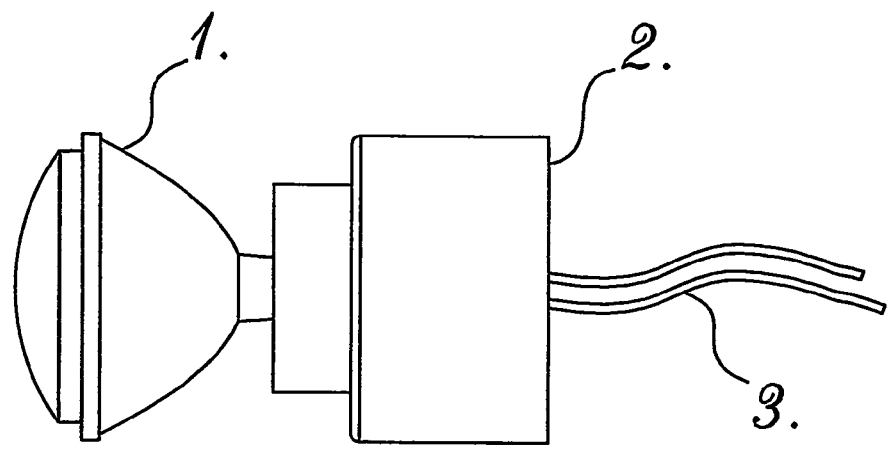
FIG. 1 is a view of an arc lamp of the prior art, where the electrical components for striking the arc and maintaining it are located immediately adjacent to the lamp.

FIG. 1 shows an arc lamp of the prior art. It consists of a lamp 1 physically attached and electrically connected to a ballast package 2. This ballast package is connected by low voltage cable 3 to a battery pack (not shown). All the electronics required to strike and maintain the arc in the arc lamp is included in the ballast package, including the relatively heavy ballast. Thus the ballast package is both substantially larger and heavier than the lamp itself. This weight is a considerable disadvantage when the lamp assembly is to be head-mounted.

Figure 2:
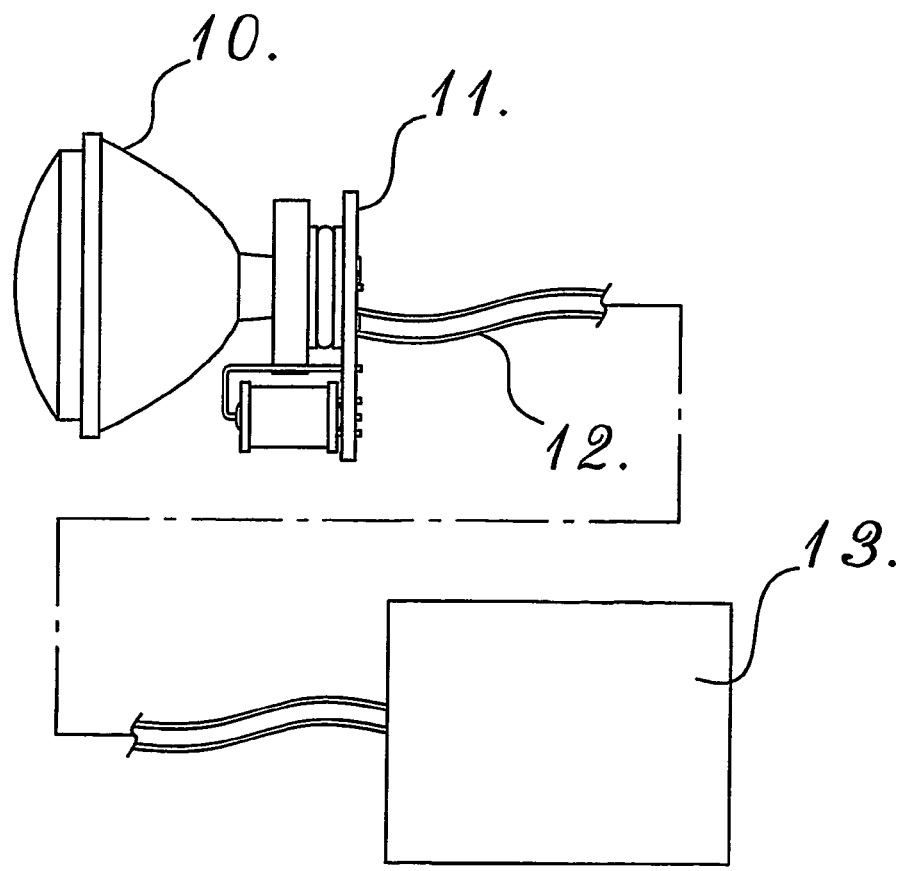
FIG. 2 is a view of an arc lamp according to the preferred embodiment of the present invention.

FIG. 2 shows an embodiment of an arc lamp made in accordance with the present invention. It includes a lamp 10, which may be the same as the lamp of FIG. 1. It is attached to a trigger printed circuit board 11, containing only those electronic components required to generate the very high voltage spike required to strike the arc of the arc lamp. It is connected, via a cable 12 rated at 300V capacity, to a remote ballast pack containing the remaining electronics required to maintain the arc in the arc lamp, including the heavy ballast, and the battery power supply.

Figure 4:
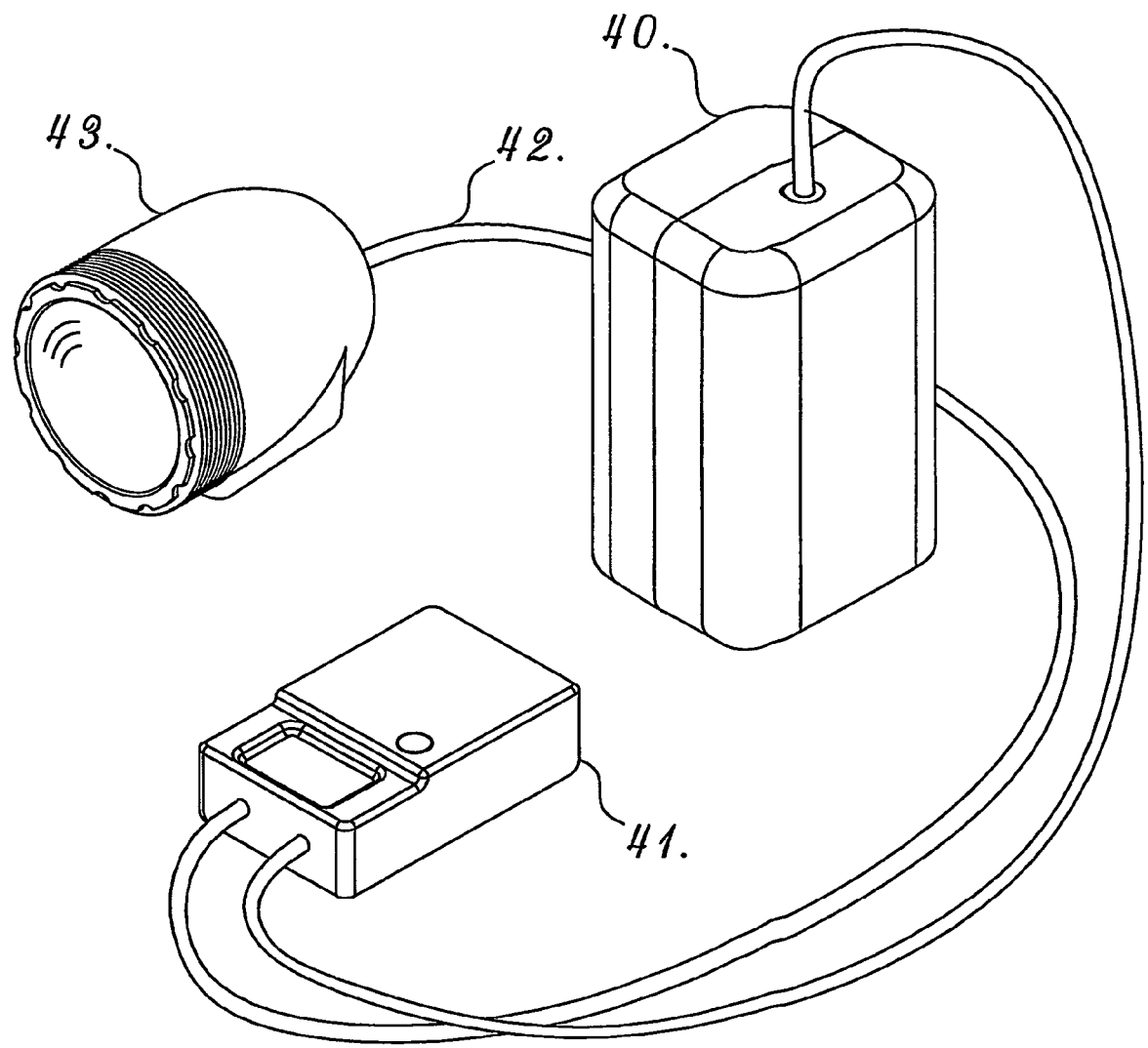
FIG. 4 is a representation of an arc lamp system according to an embodiment of the present invention.

FIG. 4 shows a complete arc lamp system according to an embodiment of the present invention. There is a battery case 40, which provides a low voltage power source for a power stage 41. In other embodiments, these could be in the same casing. There is a cable 42, with a 300 Volt capacity connecting the power stage 41 to an arc lamp enclosure 43, with the enclosure containing a lamp and a trigger circuit as illustrated in FIG. 2.

Figure 3:
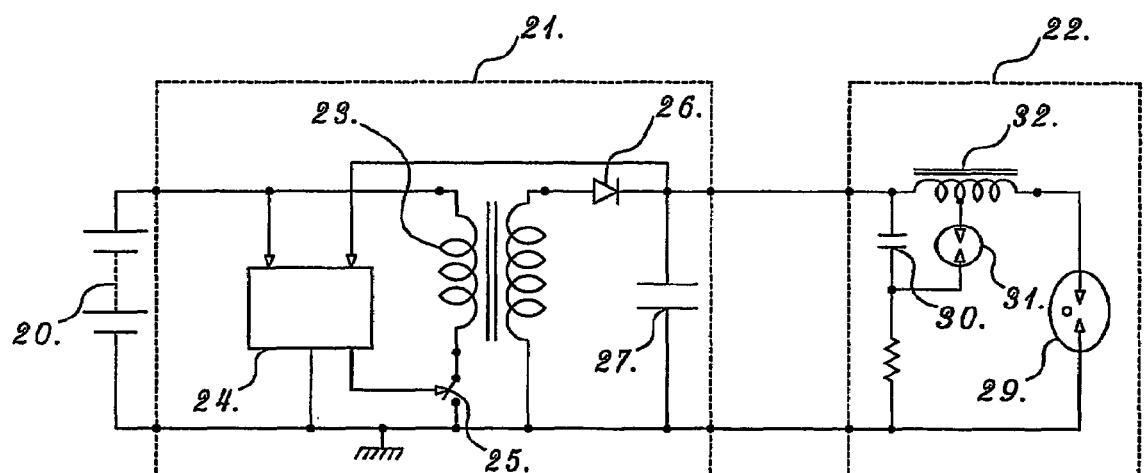
FIG. 3 is an electrical schematic of the arc lamp of FIG. 2.

FIG. 3 shows an electrical schematic of an embodiment of an arc lamp made in accordance with the present invention. It includes three basic elements, a DC battery power source 20, a power stage 21 and a trigger stage 22.

The power stage 21, which includes a DC—DC converter, which may be any type of converter suitable to provide an arc running voltage from the low voltage power source 20, for example, a boost converter.

In the embodiment of FIG. 3, the power stage includes a ballast 23 which acts as a flyback DC—DC converter without output voltage regulation. The input to the DC—DC converter is controlled by microcontroller including an oscillator function 24 which controls switch 25. The output of the ballast is rectified by diode 26 and capacitor 27.

The power stage is capable of producing an output of about 50-100V during normal operation of the lamp and a somewhat higher voltage of about 230V during the arc strike phase.

Accordingly, the power stage is able to be connected to the trigger stage by electrical connections 28 rated at about 300V capacity. Such cables are much more flexible and also safer than high-tension cables.

The arc lamp 29 is connected across the output of the power stage 21 and also across a trigger circuit made up of trigger capacitor 30, gas discharge tube 31 and trigger transformer 32.

In use, before the arc of the arc lamp is struck, the load on the power stage is essentially open circuit. The output voltage rises, charging trigger capacitor 30. At a certain voltage, in this case 230V, the gas discharge tube 31 fires, conducting a pulse of electricity through the trigger transformer 32. Consequently, the output voltage of the trigger transformer 32 rises to several kV and the arc lamp 29 strikes. Subsequently the loaded output of the power stage is restricted to 50-100V and the lamp continues to burn.

It can be seen that the maximum voltage to which the remote ballast pack and the connecting cables can be exposed is the trigger voltage of the gas discharge tube, in this case 230V. The much higher strike voltages are restricted to the trigger printed circuit board and the lamp itself.

Although the invention has been herein shown and described in what is conceived to be the most practical and preferred embodiment, it is recognized that departures can be made within the scope of the invention, which is not to be limited to the details described herein but is to be accorded the full scope of the appended claims so as to embrace any and all equivalent devices and apparatus.

The invention claimed is:

1. An arc lamp power supply including
a first part including a converter adapted to convert a low voltage power supply to provide the arc running power supply suitable for running an arc lamp after an arc has been struck;
a second part adapted to receive an output of said arc running power supply and to apply said power supply to an arc lamp, including means to effect a high voltage power supply suitable for starting an arc in arc lamp; and
flexible electric cable adapted to connect the first part to the second part, carrying the arc running power supply voltage,
wherein the means to effect a high voltage power supply includes a means to accumulate a voltage from said arc running power supply, a coil and means to apply this accumulated voltage in a pulse to the coil .

2. The power supply of claim 1 wherein the converter is a DC-DC converter.

3. The power supply of claim 2 wherein the converter is a boost converter.

4. The power supply of claim 1 wherein the converter is a DC-DC flyback converter, including a ballast and a switch a duty cycle of the switch being controlled by an oscillator.

5. The power supply of claim 4 wherein the duty cycle of the switch is controlled by an electronic controller.

6. The power supply of claim 1 wherein the first part is housed in a housing adapted to be mounted on a belt or harness to be worn by a user.

7. The power supply of claim 1 wherein the first part is housed in a housing adapted to be mounted on the frame or body of a bicycle or a motor vehicle.

8. The power supply of claim 1 wherein the means to apply voltage in a pulse is a gas discharge tube.

9. The power supply of claim 1 wherein the means to apply voltage in a pulse is a switch.

10. The power supply of claim 1 wherein the means to accumulate voltage is a capacitor.

11. The power supply according to claim 1 wherein the cable has a rated breakdown voltage of 500V or less.

12. The power supply according to claim 1 wherein the cable has a rated breakdown voltage of 300V or less.

13. The power supply according to claim 1 wherein the low voltage power supply is a battery or batteries.

14. An arc lamp power supply including
a first part including a converter adapted to convert a low voltage power supply to provide the arc running power supply suitable for running an arc lamp after an arc has been struck;
a second part adapted to receive an output of said arc running power supply and to apply said power supply to an arc lamp, including means to effect a high voltage power supply suitable for starting an arc in an arc lamp: and
a flexible electric cable adapted to connect the first part to the second part, carrying the arc running power supply voltage,
wherein the second part includes a capacitor, a gas discharge tube and a centre tapped transformer, wherein in use, the capacitor is charged by the arc running power supply until the breakdown voltage of the gas discharge tube is reached, whereupon the tube conducts, applying a voltage pulse to the centre tap on the transformer, thereby applying an arc striking voltage to a connected arc lamp.

* * * * *